United States Patent [19]

Fellman et al.

[11] Patent Number: 4,968,545
[45] Date of Patent: Nov. 6, 1990

[54] COMPOSITE TUBE AND METHOD OF MANUFACTURE

[75] Inventors: Michael Fellman, Alamo; James J. Jarvis, Martinez, both of Calif.

[73] Assignee: The Dexter Corporation, Pittsburg, Calif.

[21] Appl. No.: 115,485

[22] Filed: Nov. 2, 1987

[51] Int. Cl.$^5$ ............................. F16L 9/12; B32B 5/18
[52] U.S. Cl. ......................... 428/36.1; 428/36.4; 428/36.5; 428/283; 428/284; 428/286; 428/290; 428/313.3; 428/315.7; 428/315.9; 428/318.6; 428/323; 428/325; 428/402; 428/406; 428/339
[58] Field of Search ............... 428/36, 283, 289, 286, 428/290, 313.3, 313.5, 315.5, 315.9, 318.6, 319.3, 36.1, 36.5, 36.4, 339, 240, 323, 325, 402, 406, 315.7; 43/18.1; 138/174

[56] References Cited

U.S. PATENT DOCUMENTS

| | | | |
|---|---|---|---|
| 3,622,437 | 11/1971 | Hobaica | 428/36.5 |
| 3,989,562 | 11/1976 | Hladik et al. | 428/36.5 |
| 4,013,810 | 3/1977 | Long | 428/319.7 |
| 4,135,019 | 1/1979 | Kourtides et al. | 428/117 |
| 4,178,713 | 12/1979 | Higuchi | 428/36 |
| 4,212,693 | 7/1980 | Saito et al. | 428/36 |
| 4,355,061 | 10/1982 | Zeigler | 428/36 |

Primary Examiner—Ellis P. Robinson
Assistant Examiner—James J. Seidleck
Attorney, Agent, or Firm—George A. Skoler

[57] ABSTRACT

The invention relates to tubular composite constructions of a composite comprising at least one layer of a prepreg construction of continuous filaments of high modulus fiber in a resin matrix and at least one layer of a thin film of syntactic foam comprising rigid microballoons uniformly dispersed in a matrix resin cocurable with the resin matrix of the prepreg.

7 Claims, 1 Drawing Sheet

COMPOSITE TUBE AND METHOD OF MANUFACTURE

RELATED APPLICATIONS

This application is related to the following commonly assigned applications, filed on even date herewith: S.N. 115,281 and S.N. 115,280, U.S. Pat. No. 4,861,61.

BRIEF DESCRIPTION OF THE INVENTION

A tubular syntactic foam-prepreg composite material comprising syntactic foam of microballoons in a matrix resin bonded to a compatible resin containing carbon fiber prepreg. Unique properties are achieved in tubular constructions deriving from the combination as constrasted from tubular constructions of comparable structures but not utilizing the combination.

BACKGROUND TO THE INVENTION

SynCore®, sold by Hysol Grafil Company, Pittsburg, CA 94565 U.S.A., is a syntactic form film that takes the place of more expensive prepreg plies in stiffness critical structures. This syntactic foam is a composite material consisting of microballoons in a matrix resin. A wide variety of microballoons and matrices can be combined to make SynCore® materials. Glass is the most common microballoon material of construction, but quartz, phenolic, carbon, thermoplastic and metal coated microballoons have been used. Epoxies curing at 350° F. (177° C.) and 250° F. (121° C.) are the most common matrix resins, but matrices of bismaleimide (BMI), phenolic, polyester, PMR-15 polyimide and acetylene terminated resins have been used to produce SynCore® products. As a result of the wide variety of materials that successfully make SynCore® products, they are tailorable to a variety of applications. There is a version of SynCore® available that will cocure with all known available heat-cured composite laminating resins. Syncore® provides a unique thin film form in isotropic foam structures. Syncore® allows sandwich core concepts to be used in a thinner dimension than previously possible. The thickness limit on honeycomb cores is approximately 0.125 inch. Syncore® is available in 0.007 to 0.125 inch thicknesses but can be made in thinner or thicker sheet forms. Other core materials such as wood and sheet foam can be made thin, but are not drapable and generally require an expensive/heavy adhesive film to bond to the partner composite components. In addition, Syncore® possess excellent uniformity in thickness which provides the ability to assure quality for the composite in which it is used as a component. Syncore® is typically used to replace prepreg plies where the intent is to increase stiffness by increasing thickness.

Designing with Syncore® is straightforward because all of the analysis methods that apply to other core materials such as honeycomb apply to it. Flexural stiffness of flat plates and beams increases as a cubic function of thickness allowing a lighter, stiffer lamination than could be made from prepreg plies alone. Since Syncore® on a per volume basis typically costs less than half of a comparable carbon prepreg, it also leads to a lower cost lamination. This is illustrated by the following:

(1) Adding one ply of 0.020 inch Syncore® and eliminating one ply of prepreg does not change the weight or cost significantly, but nearly doubles the flexural rigidity.

(2) Adding one ply of 0.020 inch Syncore® and eliminating three plies of prepreg sharply decreases the cost and weight with a small decrease in rigidity.

(3) Adding one ply of 0.040 Syncore® and eliminating three plies of prepreg provides lower weight, cost and sharply increases rigidity.

(4) The introduction of unidirectional tape allows a further increase in performance at lower cost and weight at nearly the same thickness.

(5) A hybrid tape/fabric/Syncore® construction gives a very attractive set of weight and cost savings coupled with a 3.4 times increase in flexural rigidity.

Syncore® has been recommended for thin composite structures in any application where flexural stiffness, buckling, or minimum gauge construction is used. It has been shown to save weight and material cost in carbon fiber composites. It has been been offered to save weight at approximately the same cost in the case of glass fiber composites.

The manufacturing methods for employing Syncore® are very similar to those used for prepregs. Because it is not cured, it is tacky and very drapable when warmed to room temperature and is easier to layup than a comparable prepreg ply. It can be supplied in supported forms with a light weight scrim to prevent handling damage when it is frozen. It requires cold storage like prepregs, usually 0° F. (−17.7° C.) or below. The various Syncore® typically have a room temperature out-time that is much longer than their companion prepregs. Because the microballoons provide a large degree of flow control, Syncore® does not show any unusual migration during cure when normal laminate layup and bagging procedures are used. Syncore® is less sensitive to cure cycle variations than prepreg making the controlling factor the composite cure cycle selection. It will cure void free under full vacuum or low (e.g. about 10 p.s.i.) autoclave pressure. It has been cured at up to about 200 p.s.i. without exhibiting balloon crushing.

In a typical application, a sandwich of Syncore® and prepreg, such as a thicker layer of Syncore® between two thinner layers of prepreg, are held together under heat and pressure to cure the structure into a strong panel. Typical sandwich constructions of this nature are shown in U.S. Pat. Nos. 4,013,810, 4,433,068 and 3,996,654. Such composite structures typically are produced in flat sheets and in separable molds to obtain various desired shapes.

A method for making a pipe or tube using a prepreg is shown in U.S. Pat. No. 4,289,168. In this patent prepreg is wound in a coil on a mandrel, the mandrel and coil are pushed into a shaping mold, the resin is cured, and the shaped tubular member is removed from the mold and the mandrel is removed from the tube. The tube is formed entirely of prepreg with no syntactic foam components such as Syncore®.

THE INVENTION

The invention relates to tubular composite constructions of a composite comprising at least one layer of a prepreg construction of continuous filaments of high modulus fiber in a resin matrix and at least one layer of a thin film of uniform thickness of syntactic foam comprising rigid microballoons uniformly dispersed in a matrix resin cocurable with the resin matrix of the prepreg.

In one embodiment of the invention, the tubular composite construction comprises a plurality of layers of a prepreg construction of continuous filaments of high modulus fiber in a resin matrix and at least one layer of a thin film of uniform thickness of syntactic foam comprising rigid microballoons uniformly dispersed in a matrix resin cocurable with the resin matrix of the prepreg.

In another embodiment of the invention, the tubular composite construction comprises a plurality of layers of a prepreg construction of continuous filaments of high modulus fiber in a resin matrix and a plurality of layers of thin films of uniform thicknesses of syntactic foam comprising rigid microballoons uniformly dispersed in a matrix resin cocurable with the resin matrix of the prepreg.

In another embodiment of the invention, the tubular composite of the invention comprises at least one layer of a thin film of uniform thickness of a syntactic foam containing rigid microballoons in a resin matrix laminated to a prepreg construction of continuous filaments of high modulus fiber in a resin matrix and separated from the exterior tubular surface by about one (1) to about ten (10) layers of such prepreg.

In a preferred embodiment, the aforementioned tubular composite of the invention forms part of a fishing pole construction possessing enhanced buckling load capabilities.

DETAILS OF THE INVENTION

Figure 1:
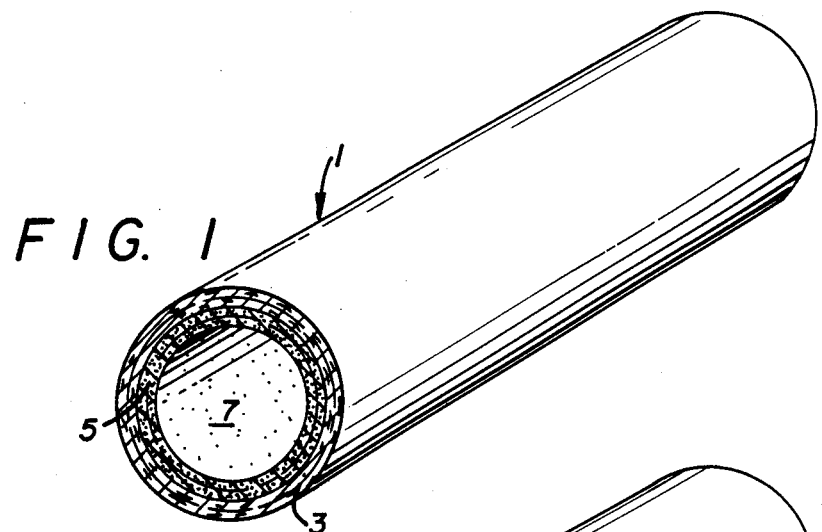
FIG. 1 depicts a cutaway of a perspective view of a segregated layered laminated tubular construction encompassed by the invention.

The tubular constructions of the invention provide a combination of unexpected advantages over tubular constructions made from prepreg constructions per se, such as:

Enhanced buckling load capabilities.
Enhanced impact resistance.
Lower raw material costs.
Enhanced shapability.
Greater product construction versatility.

The tubular constructions of the invention comprise at least one (1) layer level of tubularly shaped prepreg of unidirectionally aligned high modulus continuous filaments laterally aligned of the axial direction of the tube, impregnated in a thermosetting resin, forming the exterior of the tube, and at least one isotropic layer a thin film of uniform thickness of syntactic foam comprising rigid microballoons in a resin matrix chemically bonded to such prepreg, such as through other prepreg chemically bonded within the tube. The term "chemically bonded" means the adhesion of one layer to another in the tubular construction by associative, covalent, ionic or hydrogen, and the like, bonding.

In respect to the tubular constructions of the inventions, the significance of the syntactic foam comprising rigid microballoons in a resin matrix is that it contributes at least one property advantage such as Enhanced buckling load capabilities.

Lower weight and/or cost while retaining flexural stiffness.
Enhanced impact resistance.

The syntactic foam comprising rigid microballoons in a resin matrix should be located within the tubular construction of the invention sufficiently close to the inner surface of the tube that it can make a property contribution to the tube. In that context, the tubular composite of the invention comprises at least one layer of a thin film of uniform thickness of a syntactic foam containing rigid microballoons in a resin matrix laminated to a prepreg construction of continuous filaments of high modulus fiber in a resin matrix and separated from the exterior tubular surface by about one (1) to about ten (10) layers of such prepreg, preferably by about one (1) to about five (5) layers of such prepreg, and most preferably, by about one (1) to about three (3) layers of such prepreg. It is believed that the syntactic foam layer(s) should constitute at least about 20 volume percent of the wall thickness of the tubular construction and should start to reside within about two (2) laminate layers of thickness from the inside perimeter of the tubular construction.

The prepreg comprises continuous filaments of high performance materials such as those having a melting point ($T_m$) or glass transition temperature ($T_g$) of at least about 130° C. Suitable filaments include, by way of example, glass filaments, carbon and graphite filaments, aromatic polyamides (polyphenyleneterephthalamide) such as Kevlar ®, metal fibers such as aluminum, steel and tungsten, boron fibers, and the like.

The filaments are typically bundled into tows and the tows are assembled and spread out into a relatively thin sheet which is either coated or impregnated by the matrix resin. The matrix resin is the typical high performance thermosetting or thermosettable resins. The combination of the filament and the resin results in a prepreg suitable for forming an advanced composite structure. The resin may be any of those thermosetting or thermosettable resins employed in the manufacture of advanced compositions. The most common class of resins are the epoxy resins. They are frequently based, inter alia, on one or more of diglycidyl ethers of bisphenol A (2,2-bis(4-hydroxyphenyl)propane) or sym-tris(4-hydroxyphenyl)propane, their polyepoxide condensation products, cycloaliphatic epoxides, epoxy-modified novolacs (phenolformaldehyde resins) and the epoxides derived from the reaction of epichlorohydrin with analine, o-, m- or p-aminophenol methylene dianaline. Illustrative resins are epoxies curing at 350° F. (177° C.) and 250° F. (121° C.). Other thermosetting or thermosettable resins include the bismaleimide (BMI), phenolic, polyester (especially the unsaturated polyester resins typically used in SMC production), PMR-15 polyimide and acetylene terminated resins have been found suitable in the practice of the invention.

The invention does not depend on the method for making the prepreg. Many different kinds of prepregs may be employed without deviating from the invention.

The syntactic foam used in the practice of the invention comprise thin films of uniform thickness which contain rigid microballoons uniformly dispersed in a resin matrix. They may be any of the SynCore ® syntactic foams. The syntactic foam suitable for use in the practice of the invention desirably possesses cucurable qualities with the prepreg. It should be appreciated in making the tubular products of the invention that both the prepreg and the syntactic foam comprising rigid microballoons in a resin matrix are not fully cured prior to the construction of the tubular construction, and only after the desired tubular construction is derived is the combination cured.

The syntactic foam comprising rigid microballoons in a resin matrix comprises microballoons (microspheres) embedded in the uncured or partially cured matrix resin. The matrix resin may be any of the resins described above with respect to the prepregs. The most common of the microballoons are made of glass, but quartz, phenolic, carbon, thermoplastic and metal coated microballoons are useable.

The microballoons are synthetic hollow microspheres that comprise individual round spheres or bubbles having diameters which range from about 1 to about 500 microns, preferably about 1 to about 200 microns, with wall thicknesses of about 0.1 to about 20 microns. They typically possess densities ranging from about 0.1 to about 0.5 g./cc. The syntactic foam comprising the rigid microballoons in a resin matrix as a result have relatively low densities such as densities ranging from about 0.5 to about 0.7 g./cm.$^3$. Glass is the most common microballoon material in the practice of the invention, but quartz, phenolic, carbon, thermoplastic and metal coated microballoons are suitably employable. The syntactic foam comprising rigid microballo/ns in a resin matrix is often provided with a scrim support layer for the purpose of assisting is the handling and support of the syntactic foam layer. In describing this invention, such scrims are treated as integral components of the syntactic foam. Thus the term syntactic foam includes such handling assisting layers such as scrims.

The syntactic foam films have a thickness ranging from about 0.007 to about 0.125 inch and each film is uniform in thickness. Combinations of the syntactic foam films of different thicknesses can be combined to provide thicker sheet forms.

In the typical case, the tubular constructions of the invention comprise only the syntactic foam and the prepreg component. However, there are constructions where other materials may be added without departing from the invention. The invention also contemplates the inclusion of one or more layers of a nonwoven fabric provided with a resin binder that is cocurable with the resin of the prepreg and the syntactic foam. These added layers serve to enhance the impact and buckling resistance of the composite tubular structure. The nonwoven layer is provided in the tubular construction in contact with the prepreg and/or syntactic foam layers. In the preferred aspect of this embodiment, such additional layers are placed between syntactic foam layers and/or between prepreg layers.

The nonwoven structures may be formed from unspun or spun staple fibers having a length of from about ¼ inch to about 3 inches by garnetting and crosslaying, airlaying on a rotating screen or on an endless tenter arrangement according to the procedure of U.S. Pat. No. 3,538,564, utilizing the apparatus of U.S. Pat. Nos. 3,345,231 and 3,345,232. The nonwoven structures may be resin impregnated by spraying the thermosetting resin as a solvent solution into the batting or scrim-like structures. Preferably, the nonwoven is first bonded with a low cost thermoplastic from a latex or water dispersion or with starch from an aqueous solution, dried to fix the fibers in the nonwoven structure, and then the nonwoven structure is impregnated with the thermosetting resin. The nonwoven can be supported by a scrim layer in much the same manner that the syntactic foam is supported by one or more scrim layers.

The tubular structures can have a small diameter, as low as about 0.1 inch, to large diameters, as large as 12 inches. IN extremely large diameter tubes, in the range of about one (1) inch and greater, where the syntactic foam comprising rigid microballoons in a resin matrix constitutes less than 25% of the tube's volume, the presence of the syntactic foam tends not to exhibit a contribution, by standard measurements, to the buckling resistance of the composite tube. However, impact resistance improvement is maintained so long as the syntactic foam is provided close to the perimeter of the tubular construction.

The composite of the prepreg and the syntactic foam comprising rigid microballoons in a resin matrix may be formed in many ways, as illustrated by the following:

A cylindrical core of one or more films of the syntactic foam comprising rigid microballoons in a resin matrix is first laid up upon a mandrel form to form a syntactic foam layer and one or more layers of the prepreg is wrapped about the cylindrical syntactic foam layer(s) to form a prepreg layer. The uncured composite is then put into an oven and the composite is brought to the cure temperature of the resins in both types of layers. This laminated composite is illustrated in FIG. 1.

Figure 2:
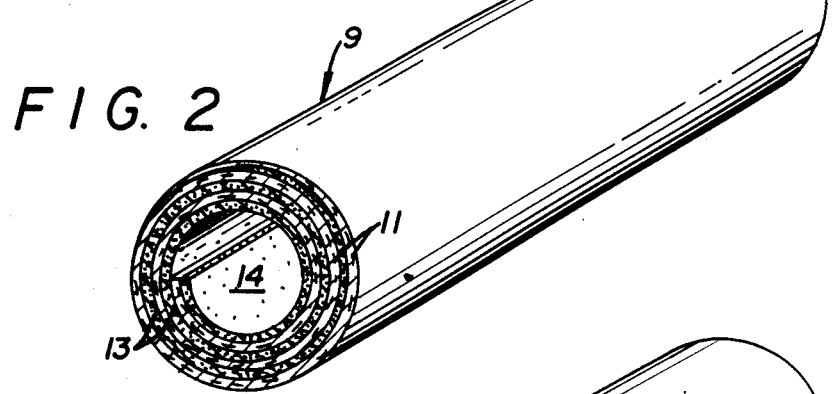
FIG. 2 depicts a cutaway of a perspective view of a spiraled layer laminated tubular construction encompassed by the invention.

A layer of the prepreg is unwound from a roll and a layer of the syntactic foam film comprising rigid microballoons in a resin matrix is unwound from a roll, and the two layers are superimposed with the prepeg on the top and the syntactic foam on the bottom. The superimposed layers are then wrapped about a mandrel form to form a spiral wrap about the form with the prepreg layer occupying the outer layer. The uncured composite is then put into an oven and the composite is brought to the cure temperature of the resins in both layers. This laminated composite is illustrated in FIG. 2.

A cylindrical core of the prepeg is first laid upon a mandrel form and then a cylindrical layer of the syntactic foam film comprising rigid microballoons in a resin matrix is wrapped around the first prepreg layer on the mandrel form. Then one or more layers of the prepreg is wrapped about the cylindrical syntactic foam layer. The uncured composite is then put into an oven and the composite is brought to the cure temperature of the resins in both layers. This laminated sandwich composite structure is illustrated in FIG. 2.

The drawings serve to illustrate the invention in respect to a number of embodiments thereof.

FIG. 1 shows a tube construction 1 comprising two laminated layers, one comprising the prepreg layer 3 and the other the syntactic foam film layer 5, both circumscribing the hollow interior 7. In this embodiment, each layer may comprise a plurality of layers of each of the laminate's components.

FIG. 2 illustrates a spiral formed tube construction 9 comprising prepreg layer 11 joined with syntactic foam film layer 13 spiral wrapped to form the wall of the tube 9, circumscribing the hollow interior 14.

Figure 3:
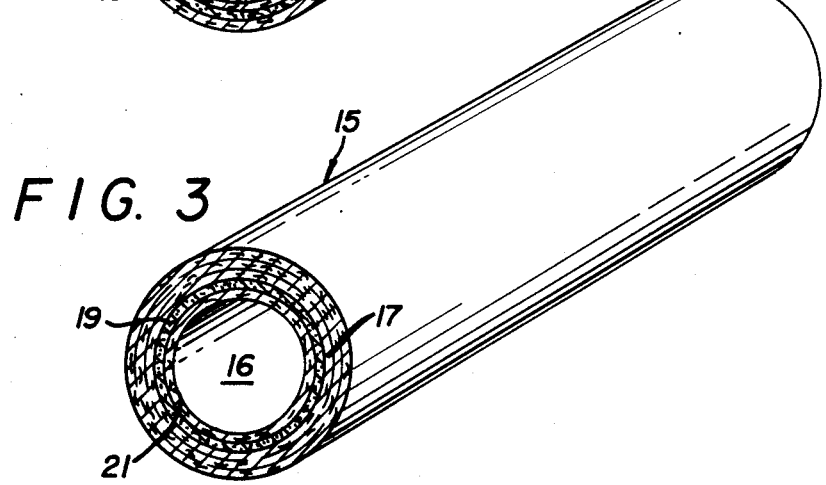
FIG. 3 depicts a cutaway of a perspective view of a segregated layered, sandwiched-type laminated tubular construction encompassed by the invention.

FIG. 3 illustrates a sandwich laminate tubular construction 15 circumscribing hollow interior 16. The tube 15 comprises an exterior prepreg layer 17 and an innermost prepreg layer 21 sandwiching the syntactic foam film layer 19. In this depiction, layer 17 represents a plurality of layers of prepreg whereas layer 21 constitutes a single prepreg layer.

To characterize the benefits of the invention, a number of tubes of the configuration of FIGS. 1-3 were made having a ⅜ inch inside diameter and an outside sufficient to make the stiffness of the tubes equal. The tube constructions compared and the results of the comparison as to their ratings in respect to stiffness, weight and cost are set forth in the following table:

| Example Number | prepreg[1] | SynCore ® | Tube Config. | Stiffness | Weight | Cost |
|---|---|---|---|---|---|---|
| 1 | glass fiber type S-glass | none | FIG. 1 | 1 | 1 | 1 |
| 2 | glass fiber type S-glass | Hysol Grafil ™ HG-9822-1[2] 0.007 in. thick | FIG. 1 | 1 | 0.91 | 1 |
| 3 | glass fiber type S-glass | Hysol Grafil ™ HG-9822-1 0.007 in. thick | FIG. 2 | 1 | 0.93 | 1.08 |
| 4 | glass fiber type S-glass | Hysol Grafil ™ HG-9822-1 0.007 in. thick | FIG. 3 | 1 | 0.96 | 0.99 |
| 5 | carbon fiber Hysol Grafil ™ XA-S[3] | none | FIG. 1 | 1 | 1 | 1 |
| 6 | carbon fiber Hysol Grafil ™ XA-S | Hysol Grafil ™ HG-9822-1 0.007 in. thick | FIG. 1 | 1 | 0.90 | 0.97 |
| 7 | carbon fiber Hysol Grafil ™ XA-S | Hysol Grafil ™ Hg-9822-1 0.007 in. thick | FIG. 2 | 1 | 1.03 | 1.01 |
| 8 | carbon fiber Hysol Grafil ™ XA-S | Hysol Grafil ™ HG-9822-1 0.007 in. thick | FIG. 3 | 1 | 1.08 | 1.01 |

[1]Resin was Hysol ® LR100-801 epoxy resin, having a curing temperature of 250° F., sold by Hysol Division, The Dexter Corporation, P.O. Box 312, Pittsburg, CA 94565
[2]Sold by the Hysol Grafil Company, P.O. Box 312, Pittsburg, CA 94565
[3]Sold by the Hysol Grafil Company, P.O. Box 312, Pittsburg, CA 94565

The tubular shape need not be only cylindrical. It may be partially conical, partially spherical, or a mixture of round shapes. The object of the invention is to provide structural benefits to round and round-like composite structures where the structure will be benefitted by the presence of syntactic foam in the form of a uniform film(s) comprising rigid microballoons in a resin matrix as a laminate component.

In current applications in sporting goods, the tubular composites of the invention are useful in a wide range of products. They may be used in large (e.g., <1.5 inch) diameter carbon prepreg fishing poles to increase the buckling load attainable. They may be used in spinnaker poles where stiffness and buckling is important. The tubular composites may be used as a fluid transport pipe, stanchion, axle rod, refrigerant or heating pipe, and the like.

In the process of the invention, the layers of the syntactic foam film comprising rigid microballoons in a resin matrix and prepreg are wound on a mandrel in spiral fashion, the layers are cured, and the mandrel is removed. The layers may be in overlapping or interleaved relation throughout the wall or through a portion of the wall of the tube. The tube may be cylindrical throughout its length or may be tapered and when tapered, the wall thickness may also be varied along the axis of the tube. Mandrel removal may be accomplished in the conventional manner as by axially withdrawing a slightly tapered mandrel or by using an air expandable mandrel and releasing the air that causes the mandrel surface to expand, so that it contracts sufficiently from the cured tube's interior surface to allow withdrawal of the tube or the mandrel, as desired.

Prepreg materials, when cured, are relatively strong and relatively heavy, having a tensile moduli ranging from $6 \times 10^6$ psi for E-glass/epoxy to over $30 \times 10^6$ psi for graphite/epoxy, with a density ranging from 1.46 to 1.8. Syntactic foam comprising rigid microballoons in a resin matrix, when cured, are much less stiff and dense, with a modulus of about 400,000 psi and a density in the range cited above.

We claim:

1. A tubular composite construction of a composite comprising at least one layer of a prepreg construction of continuous filaments of high modulus fiber in a resin matrix and at least one layer of a uniformly thick, thin film having a thickness ranging from about 0.007 to about 0.125 inch of syntactic foam comprising rigid microballoons uniformly dispersed in a matrix resin cocurable with the resin matrix of the prepreg.

2. The tubular composite construction of claim 1 wherein the construction comprises a plurality of layers of a prepreg construction of continuous filaments of high modulus fiber in a resin matrix and at least one layer of a uniformly thick, thin film having a thickness ranging from about 0.007 to about 0.125 inch of syntactic foam comprising rigid microballoons uniformly dispersed in a matrix resin cocurable with the resin matrix of the prepreg.

3. The tubular composite construction of claim 1 wherein the tubular composite construction comprises a plurality of layers of a prepreg construction of continuous filaments of high modulus fiber in a resin matrix and a plurality of layers of uniformly thick, thin films having a thickness ranging from about 0.007 to about 0.125 inch of a syntactic foam comprising rigid microballoons uniformly dispersed in a matrix resin cocurable with the resin matrix of the prepeg.

4. The tubular composite construction of claim 1 wherein the tubular composite of the invention comprises at least one layer of a uniformly thick, thin film having a thickness ranging from about 0.007 to about 0.125 inch of syntactic foam containing rigid microballoons uniformly dispersed in a resin matrix laminated to a prepreg construction of continuous filaments of high modulus fiber in a resin matrix and separated from the exterior tubular surface by about one (1) to about ten (10) layers of such prepreg.

5. The tubular composite construction of claim 1 wherein the tubular composite forms part of a fishing pole construction possessing enhanced buckling load capabilities.

6. The tubular composite construction of claim 4 wherein the tubular composite of the invention comprises at least one layer of a uniformly thick, thin film having a thickness ranging from about 0.007 to about 0.125 inch of syntactic foam containing rigid microballoons uniformly dispersed in a resin matrix laminated to a prepreg construction of continuous filaments of high modulus fiber in a resin matrix and separated from the exterior tubular surface by about one (1) to about five (5) layers of such prepreg.

7. The tubular composite construction of claim 6 wherein the tubular composite of the invention comprises at least one layer of a uniformly thick, thin film having a thickness ranging from about 0.007 to about 0.125 inch of syntactic foam containing rigid microballoons uniformly dispersed in a resin matrix laminated to a prepreg construction of continuous filaments of high modulus fiber in a resin matrix and separated from the exterior tubular surface by about one (1) to about three (3) layers of such prepreg.

* * * * *